(12) United States Patent
Cheng et al.

(10) Patent No.: US 7,654,836 B2
(45) Date of Patent: Feb. 2, 2010

(54) CARD CONNECTOR

(75) Inventors: Yung-Chang Cheng, Tu-Cheng (TW); Yong-Guang Zhu, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/286,601

(22) Filed: Sep. 30, 2008

(65) Prior Publication Data

US 2009/0098755 A1    Apr. 16, 2009

(30) Foreign Application Priority Data

Oct. 15, 2007    (TW) ............................... 96138418 A

(51) Int. Cl.
*H01R 13/62* (2006.01)

(52) U.S. Cl. ...................... 439/159; 439/630

(58) Field of Classification Search ......... 439/159–160, 439/630
See application file for complete search history.

(56) References Cited

U.S. PATENT DOCUMENTS

| | | | |
|---|---|---|---|
| 6,802,726 B2 * | 10/2004 | Chang | 439/159 |
| 6,908,322 B1 * | 6/2005 | Bricaud et al. | 439/152 |
| 7,189,087 B2 | 3/2007 | Taguchi | |
| 7,232,320 B2 * | 6/2007 | Kuo | 439/159 |
| 7,261,577 B1 * | 8/2007 | Lai | 439/159 |
| 7,371,089 B2 * | 5/2008 | Cheng | 439/159 |
| 2008/0123320 A1 | 5/2008 | Cheng | |

* cited by examiner

*Primary Examiner*—Renee Luebke
*Assistant Examiner*—Larisa Tsukerman
(74) *Attorney, Agent, or Firm*—Andrew C. Cheng; Wei Te Chung; Ming Chieh Chang

(57) ABSTRACT

A card connector adapted for receiving a card, includes an insulating housing (10) including a base portion (11), a pair of arms (12, 12') extending from opposite ends of the base portion, one of the arms having a locking device (121) at an outer side thereof; a plurality of terminals (20) retained in the insulating housing; a shell (30) covering the insulating housing and defining a cavity for receiving the card, and defining an inserting/ejecting direction of the card; and an ejector for moving the card along the inserting/ejecting direction comprising a base (51) defining a heart-shaped slot therein, an ejecting member (53) protruding into the cavity to engage with the card, a pin member (54), and a resilient member (52). The base includes a vertical wall (510) abutting against the one arm of the insulating housing, and a locking portion is disposed on the vertical wall and fastening with the locking device of the arm.

4 Claims, 3 Drawing Sheets

CARD CONNECTOR

BACKGROUND OF THE INVENTION

1. Field of the Invention

The present invention relates to a card connector, and particularly to a card connector which includes an ejector.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. Generally, the card connector is disposed on a printed circuit and includes terminals for yieldably engaging the contact or terminal array of the card, a card slot for receiving the card and an ejector for ejecting the card in the card slot.

An example of the card connector is disclosed in U.S Pub. No. 20080123320. Such card connector has an ejector which is operated by a user pushing a head of the card, or may be constituted a Push-Push ejector, an insulating housing receiving a plurality of terminals and a shell accommodating the insulating housing and the ejector in a card slot defined by the shell. The ejector comprises a base, a resilient member, an ejecting member and a pin member.

However, when the card is pushed into the card slot and moves forwardly to push the ejecting member, the base will cock. Only with a press force of the shell is not enough to prevent the base from cocking. Badly, if a user pushes the card fiercely, the ejecting member will cause the shell to release from the printed circuit board.

Therefore, the present invention is directed to solve the problem by providing a card connector which has another feature to lock with the base of the ejector and prevent the base from cocking.

SUMMARY OF THE INVENTION

An object, therefore, of the invention is to provide a card connector comprising an ejector mounted thereon stably.

In the exemplary embodiment of the invention, a card connector adapted for receiving a card, includes an insulating housing including a base portion, a pair of arms extending from opposite ends of the base portion, one of the arms having a locking device at an outer side thereof; a plurality of terminals retained in the insulating housing; a shell covering the insulating housing defining a cavity for receiving the card, and defining an inserting/ejecting direction of the card; and an ejector for moving the card along the inserting/ejecting direction comprising a base defining a heart-shaped slot therein, an ejecting member protruding into the cavity to engage with the card, a pin member, and a resilient member. The base includes a vertical wall abutting against the one arm of the insulating housing, and a locking portion is disposed on the vertical wall and fastening with the locking device of the arm.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Reference will now be made in detail to the preferred embodiment of the present invention.

Figure 1:
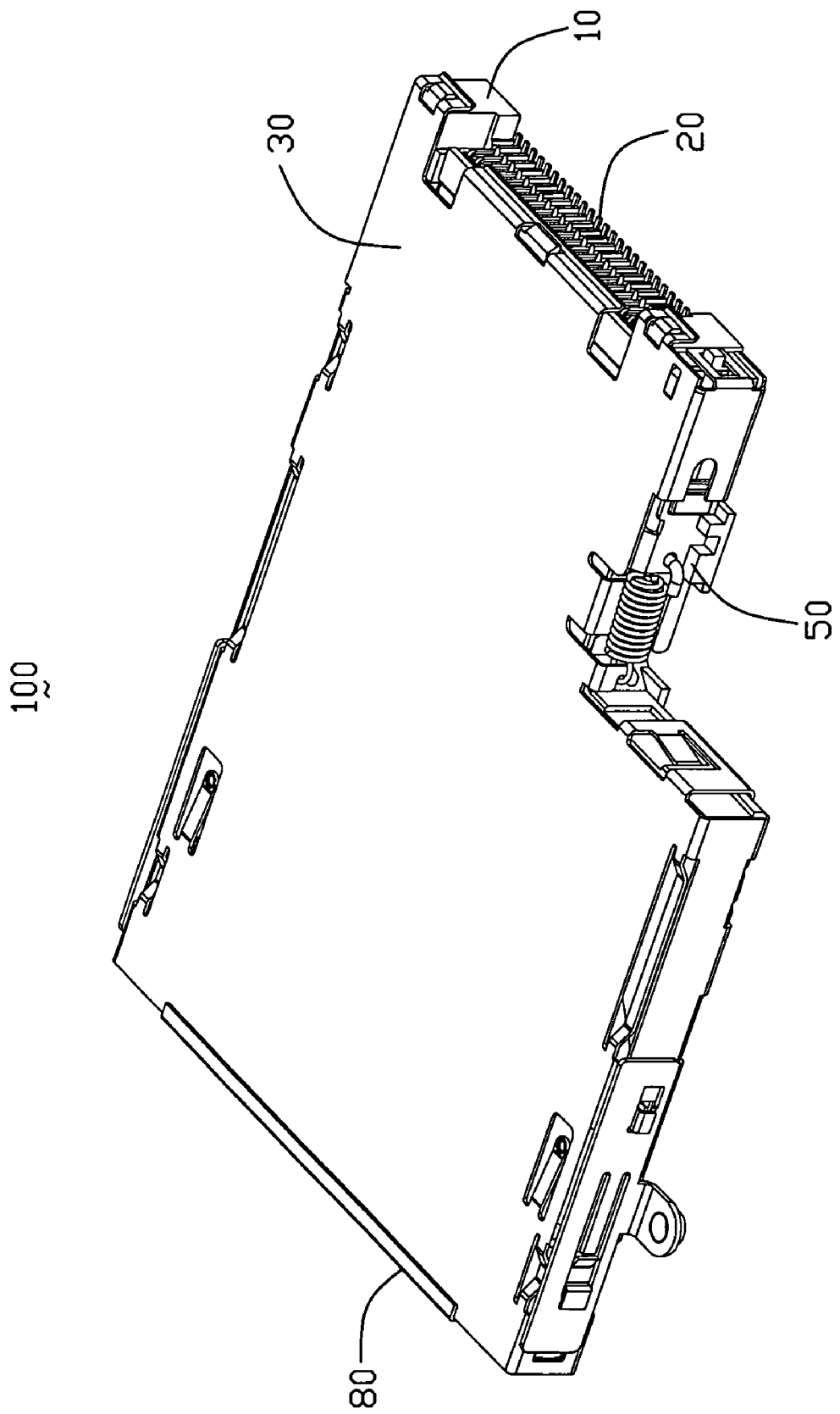
FIG. 1 is a perspective view of a card connector of present invention.
Figure 2:
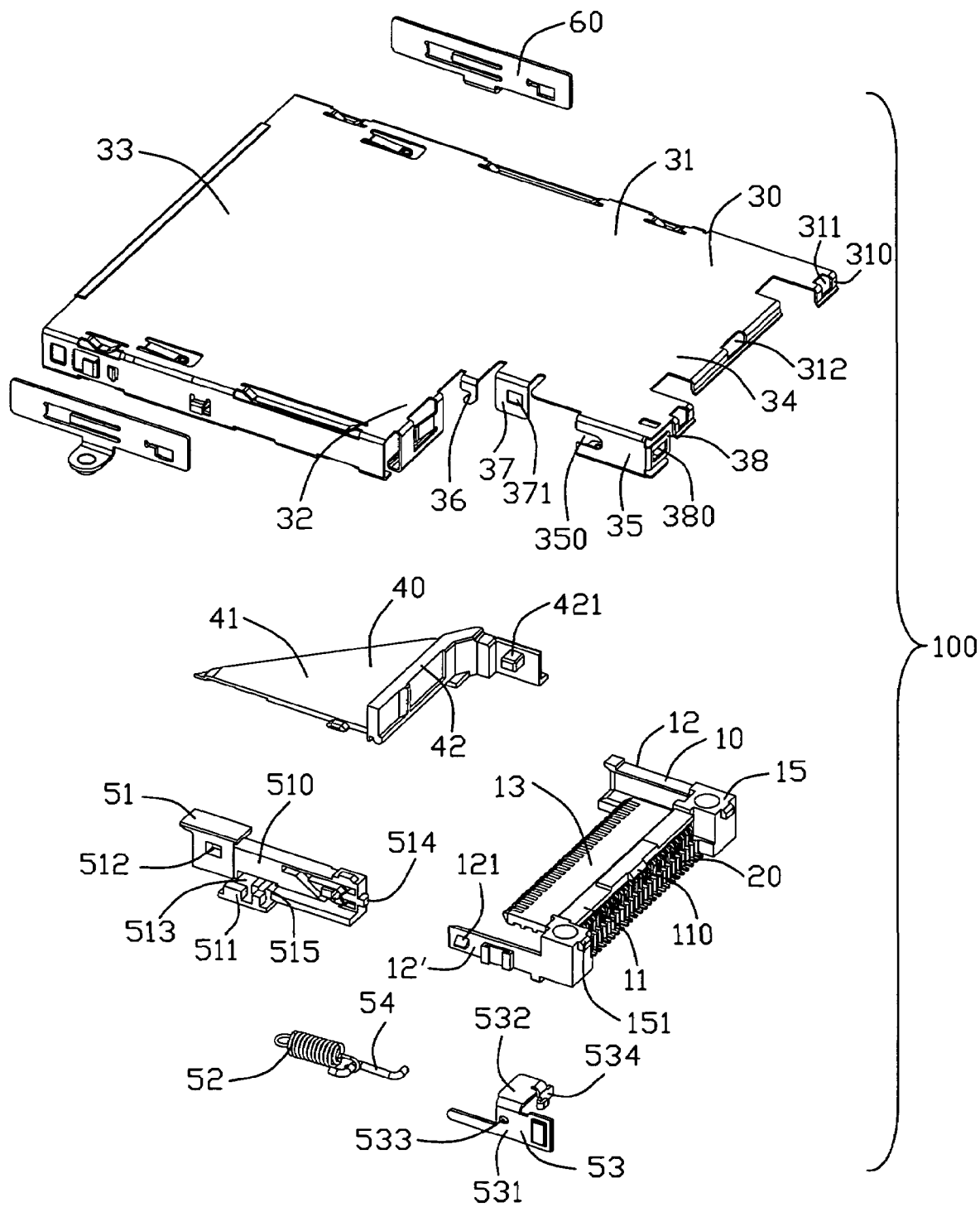
FIG. 2 is an exploded view of the card connector of present invention as shown in FIG. 1.
Figure 3:
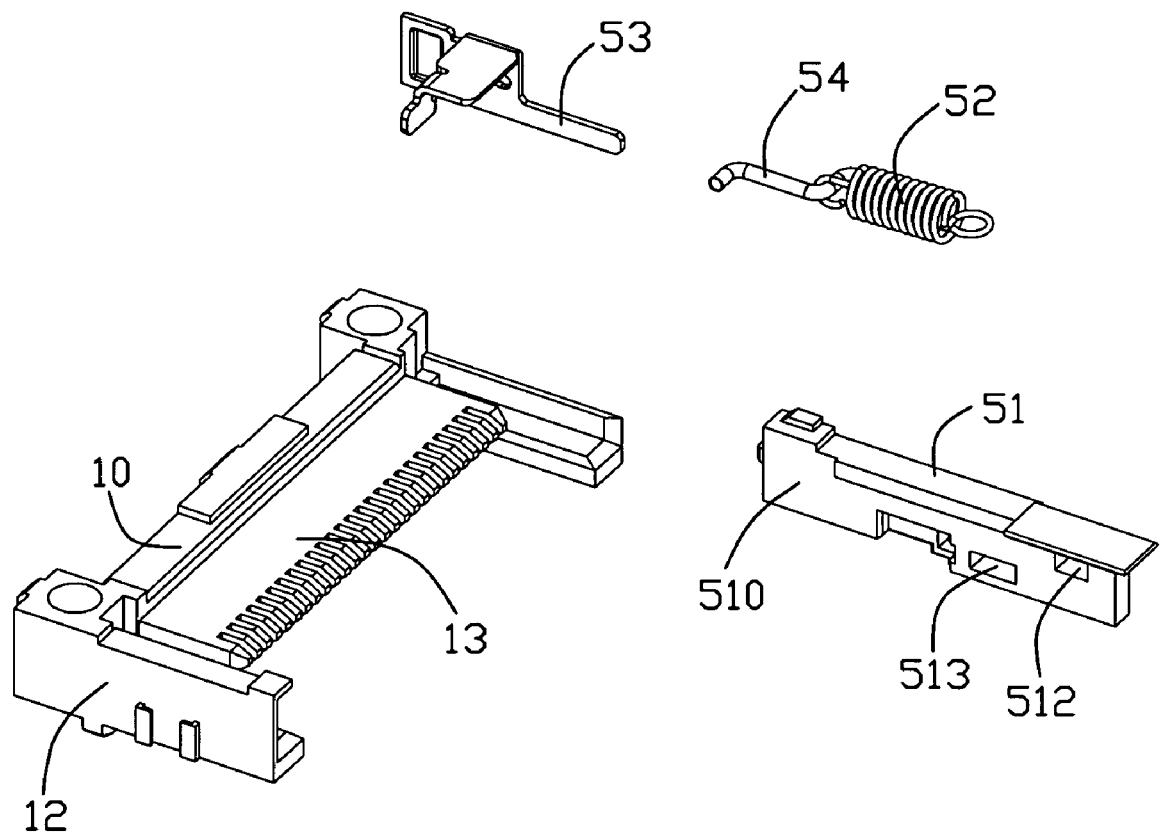
FIG. 3 is a perspective view of an insulating housing and an exploded view of an ejector of the card connector as shown in FIG. 2 in another aspect.

Referring to FIGS. 1-3, a card connector of the present invention is adapted for receiving a rectangular express card or an L-shaped express card (not shown). The card connector comprises an elongated insulating housing 10, a plurality of contacts 20 received in, a shell 30, a guide element 40, an ejector 50, a pair of stand offs 60 assembled on opposite lateral sides of the shell 30.

Referring to FIG. 2, the elongated insulating housing 10 has a base portion 11, a pair of guiding arms 12, 12' and a pair of assembling portions 15 extending rearward and forwardly from opposite sides of the base portion 11 respectively. The guiding arm 12' is designed to assemble with the ejector 50 and has a locking device 121, in this embodiment, the locking device 121 is an embossment protruding from at an outside surface thereof, and the locking device also can be a locking hole or other devices. A mating portion 13 extends from a lower part of the base portion 11 and is disposed between the two guiding arms 12. The contacts 20 are received in the mating portion 13 and extend beyond the insulating housing 10 to be soldered on a circuit board (not shown). Approximately at a middle portion of the base portion 11, a first protrusion 110 is formed thereof. A pair of second protrusions 151 are formed at a front surface of the assembling portion 15.

The shell 30 covers the insulating housing 10 to define a card receiving space (not labeled) with a card insertion opening 80 therebetween. The shell 30 is of L shape because the shell 30 defines a step portion 32 at front end thereof. The L-shaped shell 30 comprises a main body 31 and sidewalls (not labeled) extending downwardly from the main body 31. The main body 31 comprises a front section 33 and a rear section 34 extending rearward from the front section 33. The width of the rear section 34 is narrower than that of the front section 33 along a transverse direction perpendicular to an inserting/ejecting direction of a card. A locking piece 36, a holding piece 37 with a receiving hole 371 thereon and a receiving portion 35 extend downwardly from a lateral side of the rear section 34. A pair of holding pieces 310 with through holes 311 are formed at opposite sides of a front end of the front section 33 to lock with the second protrusions 151 of the assembling portion 15. The receiving portion 35 is in alignment with the ejector 50 and comprises a cutout 350 at a rear end thereof, and a locking piece 38 with a locking hole 380 to lock with the ejector 50.

The guide element 40 is approximately a triangle shape and assembled to the shell 30 adjacent to the step portion 32. The guide element 40 has a board 41 and an L-shaped perpendicular wall 42 extending forwardly and downwardly from a front end of the board 41. The wall 42 is formed with a protrusion 421 at an outside thereof to be received in the receiving hole 371 of the holding piece 37.

The ejector 50 comprises a base 51, a resilient member 52, an ejecting member 53 and a pin member 54. In this embodiment, the resilient member 52 is a spring. The base 51 abuts against the guiding arm 12' adjacent to the guide element 40 and comprises a vertical portion 510 with a heart-shaped slot (not labeled) therein and a guiding wall 511. The vertical portion 510 has a window portion 512 opposite to the guiding wall, a block 514, and a locking portion 513 to retain the embossment 121 of the insulating housing 12, in this embodiment, the locking portion 513 is a hole, and in other embodiments, the locking portion 513 also can be designed in an embossment protruding from an inner surface of the vertical wall 510 to lock with the locking device of the insulating housing 12 or other devices. As show in FIG. 3, the window portion 512 and the locking portion 513 go through the vertical portion horizontal 510, respectively. A guiding slot 515 is formed between the vertical wall 510 and the guiding wall 511 along the inserting/ejecting direction of the card. The block 514 is at a middle portion of the front end of the vertical wall 510 to be held in the locking hole 380 of the locking piece 38. Thus, the front end of the vertical portion 510 is received in the receiving portion 35 securely. Meanwhile, the rear end of the vertical portion 510 is locked in such manner that the protrusion 421 of the guide element 40 is received in the receiving hole 371 of the holding piece 37 after the protrusion 421 passes through the window portion 512.

The ejecting member 53 is moveably assembled on the base 51 and comprises a sliding portion 531 sliding along the guiding slot 515, an intermediate portion 532 extending horizontally from an upper portion of the sliding portion 531 and an ejecting portion 534 extending downwardly from a free end of the intermediate portion 532 and exposed into the card receiving space to engage with the card directly.

One end of the pin member 54 locks in a hole 533 defined in the base 531 after locking with one end of the spring 52, and the other end thereof is moveably received in the heart-shaped slot of the sliding portion 531. Thus, the other end of the spring 52 locks on the locking portion 36 of the shell 30 to move the pin member 54 at an original position. The pin member 54 is capable of invading into the cutout 350 of the receiving portion together with the ejection/insertion of the card.

While a preferred embodiment in accordance with the present invention has been shown and described. Particularly, the major object of present invention is to dispose a locking device 121 on the insulating housing to fasten with a corresponding locking portion 513 of the base 51. Therefore, when the card is inserted/ejected, the base can not cock.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A card connector for receiving a card, comprising:
an insulating housing comprising a base portion, and a pair of arms extending from opposite ends of the base portion, one of the arms having a locking device at an outer side thereof;
a plurality of terminals retained in the insulating housing to engage with the card;
a shell covering the insulating housing and defining a cavity for receiving the card, and defining an inserting/ejecting direction of the card; and
an ejector for moving the card along the inserting/ejecting direction comprising a base defining a heart-shaped slot therein, an ejecting member protruding into the cavity to engage with the card, a pin member capable of sliding in the heart-shaped slot, and a resilient member to move the pin member at an original position, the base comprising a vertical wall abutting against the one arm of the insulating housing, a locking portion disposed on the vertical wall and fastening with the locking device of the arm, wherein the locking device of the arm is an embossment or a locking hole, and the locking portion of the base is a window portion going through the vertical wall or an embossment protruding inwardly from the inner surface of the vertical wall.

2. The card connector as claimed in claim 1, wherein the shell comprises a main body comprising a front portion and a rear portion with a card entrance, and a receiving portion extends downwardly from the front portion to receive one end of the ejector.

3. The card connector as claimed in claim 2, wherein the receiving portion of the shell defines a cutout at a rear end thereof for movement of the pin member.

4. An electrical card connector comprising:
an insulative housing defining a card receiving cavity in a front portion;
a plurality of contacts disposed in the housing;
a metallic shell enclosing the housing;
an ejector including a stationary base with a heart-shaped slot therein, a moveable ejecting member with a tab to reject a card, a pin with one end fixed to the ejecting member and fastened to one end of a spring under a condition that the other end of the spring is locked to the shell, the other end of the pin moveable along the heart-shaped slot; wherein
the base is located between the pin and the card receiving cavity in a transverse direction, wherein said ejecting member includes an intermediate horizontal portion crossing over the base with the tab, which is located at a free end of said intermediate horizontal portion, extending into the card receiving cavity.

* * * * *